(12) United States Patent
Hikmet et al.

(10) Patent No.: US 12,145,310 B2
(45) Date of Patent: Nov. 19, 2024

(54) FDM PRINTED LUMINAIRES WITH SURFACE TEXTURE

(71) Applicant: SIGNIFY HOLDING B.V., Eindhoven (NL)

(72) Inventors: Rifat Ata Mustafa Hikmet, Eindhoven (NL); Loes Johanna Mathilda Koopmans, Soerendonk (NL); Stefan Willi Julius Gruhlke, Baesweiler (DE)

(73) Assignee: SIGNIFY HOLDING, B.V., Eindhoven (NL)

(*) Notice: Subject to any disclaimer, the term of this patent is extended or adjusted under 35 U.S.C. 154(b) by 279 days.

(21) Appl. No.: 16/625,798

(22) PCT Filed: Jun. 22, 2018

(86) PCT No.: PCT/EP2018/066781
§ 371 (c)(1),
(2) Date: Dec. 23, 2019

(87) PCT Pub. No.: WO2019/002133
PCT Pub. Date: Jan. 3, 2019

(65) Prior Publication Data
US 2020/0122386 A1 Apr. 23, 2020

(30) Foreign Application Priority Data
Jun. 29, 2017 (EP) .................. 17178697

(51) Int. Cl.
*B29C 64/118* (2017.01)
*B33Y 10/00* (2015.01)
(Continued)

(52) U.S. Cl.
CPC ........ *B29C 64/118* (2017.08); *B29K 2009/06* (2013.01); *B29K 2025/06* (2013.01);
(Continued)

(58) Field of Classification Search
CPC ....... B29C 64/118; B33Y 10/00; B33Y 80/00; B29K 2009/06; B29K 2025/06; B29K 2033/12; B29K 2069/00
See application file for complete search history.

(56) References Cited

U.S. PATENT DOCUMENTS

| | | |
|---|---|---|
| 8,097,336 B2 | 1/2012 | Owens |
| 10,589,461 B2 * | 3/2020 | Hikmet ................. B29C 64/165 |

(Continued)

FOREIGN PATENT DOCUMENTS

| | | | |
|---|---|---|---|
| WO | WO-2010075395 A2 * | 7/2010 | ............. B29C 70/58 |
| WO | 2016083181 A1 | 6/2016 | |

(Continued)

*Primary Examiner* — Seyed Masoud Malekzadeh

(57) ABSTRACT

A method for 3D printing a 3D item (10), the method comprising (i) providing 3D printable material (201) comprising particles (410) embedded in the 3D printable material (201), wherein the particles (410) have a longest dimension length L1, a shortest dimension length L2, and an aspect ratio AR defined as the ratio of the longest dimension length L1 and the shortest dimension length L2, and (ii) depositing during a printing stage 3D printable material (201) to provide the 3D item (10) to provide layers (230) of the 3D printed material (202) with a layer height H, wherein AR>4 and H/L1<1.

16 Claims, 7 Drawing Sheets

(51) Int. Cl.
  *B33Y 80/00* (2015.01)
  *B29K 9/06* (2006.01)
  *B29K 25/00* (2006.01)
  *B29K 33/00* (2006.01)
  *B29K 69/00* (2006.01)

(52) U.S. Cl.
  CPC ...... *B29K 2033/12* (2013.01); *B29K 2069/00* (2013.01); *B33Y 10/00* (2014.12); *B33Y 80/00* (2014.12)

(56) References Cited

U.S. PATENT DOCUMENTS

| | | | |
|---|---|---|---|
| 2010/0160547 A1* | 6/2010 | Martinoni | C08K 3/013 264/497 |
| 2015/0367576 A1 | 12/2015 | Page | |
| 2016/0346997 A1 | 12/2016 | Lewis et al. | |
| 2017/0312985 A1* | 11/2017 | Talgorn | B29C 64/118 |

FOREIGN PATENT DOCUMENTS

| WO | 2016083797 A1 | 6/2016 |
|---|---|---|
| WO | 2017080842 A1 | 5/2017 |

\* cited by examiner

FDM PRINTED LUMINAIRES WITH SURFACE TEXTURE

CROSS-REFERENCE TO PRIOR APPLICATIONS

This application is the U.S. National Phase application under 35 U.S.C. § 371 of International Application No. PCT/EP2018/066781, filed on Jun. 22, 2018, which claims the benefit of European Patent application Ser. No. 17/178,697.3, filed on Jun. 29, 2017. These applications are hereby incorporated by reference herein.

FIELD OF THE INVENTION

The invention relates to a method for manufacturing a 3D item. The invention also relates to the 3D (printed) item obtainable with such method. Further, the invention relates to a lighting system including such 3D (printed) item. Yet further, the invention also relates to a 3D printable thermoplastic polymer material (for use in such method).

BACKGROUND OF THE INVENTION

Textured 3D printed materials are known in the art. WO2016/083181, for instance, describes a printing head for a 3D printing device that comprises a nozzle arranged to print a layer of a printing material on a receiving surface and a texturing member arranged to texture the layer or the receiving surface during printing of said layer. The nozzle comprises an outlet including the texturing member and the outlet is shaped to form protrusions extending from a main surface of the layer for interlocking with a subsequent layer. The texturing member ensures that contacting layers formed with the printing head exhibit improved adhesion due to the increased contact surface area between the layers. This yields stronger 3D articles printed in this manner. A printing apparatus including the printing head, a printing method, and a printed article are also described in this document.

US 2016/346997 A1 discloses a 3D printable composite ink formulation which comprises an uncured polymer resin, filler particles, and a latent curing agent. The composite ink formulation comprises a strain-rate dependent viscosity and a plateau value of elastic storage modulus G' of at least about 10<3>Pa. D1 further discloses a filamentary structure which is extruded from a nozzle during 3D printing. The filamentary structure comprises a continuous filament which includes filler particles dispersed therein. At least some fraction of the filler particles in the continuous filament comprises high aspect ratio particles which have a predetermined orientation with respect to a longitudinal axis of the continuous filament. D1 further discloses a 3D printed cellular structure which comprises a cellular network which comprises cell walls which separates empty cells. The cell walls comprise a polymer composite which comprises filler particles dispersed in a polymer matrix. The filler particles comprise high aspect ratio particles which have a predetermined orientation within the cell walls.

WO 2010/075395 A2 discloses a method which comprises to provide a powder composition including at least one semi-crystalline or crystalline aromatic laser-sinterable polyester polymer which has a melting temperature between 120 and 220 degrees Celsius; and selectively laser sintering the powder composition to form a three-dimensional article.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerizable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast and can be used for printing complicated object.

FDM printers are relatively fast, low cost and can be used for printing complicated 3D objects. Such printers are used in printing various shapes using various polymers. The technique is also being further developed in the production of LED luminaires and lighting solutions.

In injection molded parts surface finish and texture may be realized by texturing the mold. In the case of FDM, this may need to be done in a different way.

Hence, it is an aspect of the invention to provide an alternative 3D element, which preferably further at least partly obviates one or more of above-described drawbacks. It is also an aspect of the invention to provide an alternative 3D printing method, which preferably further at least partly obviates one or more of above-described drawbacks. Yet further, it is an aspect of the invention to provide an alternative lighting system comprising such 3D item, which preferably further at least partly obviates one or more of above-described drawbacks. Yet further, it is an aspect to provide an alternative 3D printable thermoplastic polymer material. The present invention may have as object to overcome or ameliorate at least one of the disadvantages of the prior art, or to provide a useful alternative.

Therefore, in a first aspect the invention provides a method for 3D printing a 3D item by means of Fused Deposition Modeling (FDM), the method comprising (i) providing 3D printable thermoplastic polymer material comprising particles embedded in the 3D printable thermoplastic polymer material, wherein the particles have a longest dimension length (L1), a shortest dimension length (L2), and an aspect ratio AR defined as the ratio of the longest dimension length (L1) and the shortest dimension length (L2), and (ii) depositing during a printing stage 3D printable thermoplastic polymer material to provide the 3D item to provide layers of the 3D printed thermoplastic polymer material with a layer height (H), wherein: (a) 1≤AR≤4 and $1 \leq H/L2 \leq 5$; or (b) $AR \geq 4$ and $H/L1 \leq 1$; or (c) $1 \leq AR \leq 4$ and $5 \leq H/L2 \leq 100$. Yet further, in an aspect the invention provides a 3D printable thermoplastic polymer material comprising an (thermoplastic) polymer with particles embedded therein. In specific embodiments, the invention provides 3D printable thermoplastic polymer material comprising a thermoplastic material, wherein the thermoplastic material comprises particles embedded in thermoplastic material, wherein the particles have a longest dimension length (L1), a shortest dimension length (L2), and an aspect ratio AR defined as the ratio of the longest dimension length (L1) and the shortest dimension length (L2), wherein: (i) $1 \leq AR \leq 4$; or (ii) $AR \geq 4$.

With such parameters, the surface roughness and surface texture can be controlled. This can be used for various reasons, such as to provide distance elements, to improve, or reduce fingerprint detection, to increase (or decrease) thermal transfer to the environment (or another product in physical contact with the surface of the 3D printed item during use of the 3D printed item). Would the particulate material and/or polymeric material be used for light guiding, the surface texture may be used to control light outcoupling (or light incoupling). Further, control of the surface texture may be used to control hydrophobicity or impact on fluids or fluid streams streaming along the surface of the 3D item.

Hence, in first embodiments $1 \leq AR \leq 4$ and/or $1 \leq H/L2 \leq 100$, especially $1 \leq AR \leq 4$ and $1 \leq H/L2 \leq 100$, such as wherein $1 \leq H/L2 \leq 5$ or wherein $5 \leq H/L2 \leq 100$, applies.

With the first embodiments, is it possible to hide the ribbed structure or to provide a sub-structured matt surface. Hence, when desired the ribbed structure, which is inherent to FDM printed items, may be less pronounced. Hence, especially $1 \leq AR \leq 4$ and $1 \leq H/L2 \leq 10$ applies. In specific embodiments $1 \leq AR \leq 2$ applies. In these ranges, the ribbed structure formation and properties may especially be controlled. Instead of the term "matt" also the terms "dull" or "frosted" may be applied.

Further, if desired a matt sub-structures surface may be provided. This may e.g. be of interest for applications where shiny appearance can be reduced especially when there are also surface substructures are present. Hence, especially $1 \leq AR \leq 4$ and $5 \leq H/L2 \leq 100$ applies. In further specific embodiments $1 \leq AR \leq 2$. In specific embodiments $5 \leq H/L2 \leq 100$; in further specific embodiments $10 \leq H/L2 \leq 80$ applies. In these ranges, the matt appearance formation and matt property may especially be controlled.

In embodiments, the particles may comprise elongated shaped particles having an aspect ratio AR larger than 1. It is also possible to use "symmetric particles" with irregular shapes or regular shaped particles like spheres. With elongated particles, amongst optical effects may be created, fiber-like related aspects may be used, like transport of light, shape of the layers may be controlled, etc.

Especially, in second embodiments $AR \geq 4$ and $H/L1 \leq 1$ applies. In the second embodiments, it is possible to create a cactus like effect. Such latter surface may have specific properties for water retention or dust retention, etc., or more provide a kind of distance elements or light outcoupling elements, etcetera. Hence, with the present method it is possible to tailor the appearance of the (outer) surface of the 3D item. Hence, especially $AR \geq 4$ and $H/L1 \leq 1$ applies. In specific embodiments $AR > 4$ applies; in further specific embodiments $AR \geq 100$, such as $4 \leq AR \leq 10,000$. In specific embodiments $0.001 \leq H/L1 \leq 1$ applies; in further specific embodiments $0.01 \leq H/L1 \leq 1$ applies, in further specific embodiments $0.1 \leq H/L1 \leq 1$ applies; in further specific embodiments $0.5 \leq H/L1 \leq 0.95$ applies; in further specific embodiments $0.7 \leq H/L1 \leq 0.90$ applies; in further specific embodiments $H/L1 < 1$, such as $H/L1 \leq 0.5$ applies. In these ranges, the cactus appearance formation and cactus property may especially be controlled. Best cactus appearance formation and cactus property was obtained by $0.5 < H/L1 < 1$ because L1 is larger than H but L1 is smaller than 2H such that the particle can have different orientations in the printable and/or printed thermoplastic polymer material. The particles in this embodiment are preferably fiber like cylindrical particles.

Particle sizes above refer to average sizes as the particles do not necessarily have mono distribution.

The term dimension may refer to length, width, height, diameter, major axis length, minor axis length, etcetera. In case of a spherical particle, the longest dimension and shortest dimension are equal, and are the diameter. In case of a bar like element (rectangular cuboid), the longest dimension may be the length and the shortest dimension may be the height (assuming the width is larger than the height). For irregular shaped particles, for the sake of easiness, the smallest rectangular cuboid (rectangular parallelepiped) enclosing the irregular shaped particle may be used to define the length, width and height.

As indicated above, the 3D printable thermoplastic polymer material comprises particles embedded in the 3D printable thermoplastic polymer material. Such material may be provided as filament, like a filament of thermoplastic material with particles in the filament, or such material may be provided as particulate material, like particles of thermoplastic material with smaller particles in the particles of the particulate material.

The combination of particles and the 3D printable thermoplastic polymer material is chosen such that a 3D printable thermoplastic polymer material is provided, wherein the particles are embedded. This material may be expelled from printer nozzle during the 3D printing stage. In embodiments, the 3D printable thermoplastic polymer material comprises up to 40 vol. % of the particles, relative to the total volume of the 3D printable thermoplastic polymer material. Even more especially, the 3D printable thermoplastic polymer material comprises in the range of 0.5-15 vol. %, especially 1-15 vol. %, of the particles, relative to the total volume of the 3D printable thermoplastic polymer material, such as in embodiments in the range of 0.5-5 vol. %, such as especially 1-5 vol. %, of the particles, relative to the total volume of the 3D printable thermoplastic polymer material. With higher percentages, the 3D printable may be difficult to process, and with lower percentages the optical effects may be considered too small. Hence, especially 0.5-15 vol. %, such as 1-5 vol. % may be applied.

Essentially the same values may apply to the thus obtained 3D printed thermoplastic polymer material. Therefore, in embodiments the 3D printed thermoplastic polymer material comprises up to 40 vol. % of the particles, relative to the total volume of the 3D printed thermoplastic polymer material. Even more especially, the 3D printed thermoplastic polymer material comprises in the range of 0.5-15 vol. %, especially 1-15 vol. %, of the particles, relative to the total volume of the 3D printed thermoplastic polymer material, such as in embodiments in the range of 0.5-5 vol. %, such as especially 1-5 vol. %, of the particles, relative to the total volume of the 3D printed thermoplastic polymer material.

With the printer, the 3D printable thermoplastic polymer material is expelled from the printer nozzle and deposited on a receiver item (or on already 3D printed thermoplastic polymer material on the receiver item). Therefore, the method provides depositing during a printing stage 3D printable thermoplastic polymer material to provide the 3D item to provide layers of the 3D printed thermoplastic polymer material with a layer height (H). Especially, control of layer height may be executed with the nozzle, such as by adjusting the distance between the nozzle and the layer deposited previously (or the receiver item, when no layer has deposited yet).

In specific embodiments, the particle dimensions and the layer height may be chosen such, that a substructure of a plurality of ribs is provided. Therefore, in embodiments the 3D printed item has a surface (defined by a plurality of layers), wherein the surface comprises substructures with tops and bottoms, wherein the substructures comprise a plurality of layers with a top-top distance (d3) between adjacent tops, wherein $d3/H \geq 10$, such as especially wherein $10 \leq d3/H \leq 1000$. This may especially apply in embodiments wherein $1 \leq AR \leq 4$ and $5 \leq H/L2 \leq 100$. Such substructure may e.g. also be of relevance for inducing decorative effects, or for other effects (such as defined above).

In embodiments, the 3D item may be generated on a flat substrate. In other embodiments, the 3D item may be generated on a substrate that may have one or more curved or facetted parts. Therefore, in embodiments the invention also provides printing during the printing stage the 3D printable thermoplastic polymer material on a substrate with one or more of (i) a curved face, (ii) a facetted face, and (iii) faces configured relative to each under an angle. In this way, a 3D with a specific shape may be provided.

As further also elucidated below, in specific embodiments the 3D printable thermoplastic polymer material may comprise one or more of acrylonitrile butadiene styrene copolymer (ABS), polystyrene (PS), polycarbonate (PC), polyethyleneteleptalate (PET), polymethylmethacrylate (PMMA), and copolymers of two or more of these.

In specific embodiments, one or more of the 3D printable thermoplastic polymer material and the particles are transmissive for one or more wavelengths in the visible. This may allow special optical effects like a transmissive polymer for light guiding and particles for outcoupling, or light guiding through light transmissive (elongated) particles. Further, also both the 3D printable thermoplastic polymer material and the particles may be light transmissive, but may have different indices of refraction. This may also be used for optical effects like in optical elements, for light guiding, etc.

The herein described method provides 3D printed items. Hence, the invention also provides in a further aspect a 3D printed item obtainable with the herein described method. Hence, in yet a further aspect the invention also provides a 3D printed item comprising 3D printed thermoplastic polymer material, wherein the 3D printed thermoplastic polymer material especially comprises a thermoplastic material, wherein the 3D printed thermoplastic polymer material comprises particles embedded in the 3D printed thermoplastic polymer material, wherein the particles have a longest dimension length (L1), a shortest dimension length (L2), and an aspect ratio AR defined as the ratio of the longest dimension length (L1) and the shortest dimension length (L2), and wherein the 3D item comprises layers of the 3D printed thermoplastic polymer material with a layer height (H), wherein: (i) $1 \leq AR \leq 4$ and $1 \leq H/L2 \leq 5$; or (ii) $AR \geq 4$ and $H/L1 \leq 1$; or (iii) $1 \leq AR \leq 4$ and $5 \leq H/L2 \leq 100$. As indicated above, such 3D printed item may be obtained with the herein described method.

In specific embodiments, the longest dimension length (L1) is selected from the range of 5 µm-1 mm, such as 5-500 µm. Especially, the layer height (H) may be selected from the range of 50 µm-20 mm, like 50 µm-10 mm, such as especially 100 µm-10 mm. With such layer heights, it may especially be able to control the appearance of the outer surface.

As indicated above, in embodiments the 3D printed thermoplastic polymer material comprises up to 40 vol. % of the particles, relative to the total volume of the 3D printed thermoplastic polymer material. Even more especially, the 3D printed thermoplastic polymer material comprises in the range of 0.5-15 vol. %, especially 1-15 vol. %, of the particles, relative to the total volume of the 3D printed thermoplastic polymer material, such as in embodiments in the range of 0.5-5 vol. %, such as especially 1-5 vol. %, of the particles, relative to the total volume of the 3D printed thermoplastic polymer material.

As further also elucidated below (and above), in specific embodiments the 3D printed thermoplastic polymer material may comprise one or more of acrylonitrile butadiene styrene copolymer (ABS), polystyrene (PS), polycarbonate (PC), polyethyleneteleptalate (PET), polymethylmethacrylate (PMMA), blends of two or more of these, and copolymers of two or more of these.

As indicated above, in specific embodiments one or more of the 3D printed thermoplastic polymer material and the particles are transmissive for one or more wavelengths in the visible.

Therefore, in yet a further aspect the invention also provides a lighting system comprising (a) a light source configured to generate light source light and (b) a 3D printed item as defined herein, configured to transmit or reflect at least part of the light source light.

Below, some aspects of or variants on the invention are further elucidated.

As indicated above, the invention may thus provide a method comprising providing a filament of 3D printable thermoplastic polymer material and printing during a printing stage said 3D printable thermoplastic polymer material on a substrate, to provide said 3D item.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable thermoplastic polymer material comprises a 3D printable thermoplastic polymer material selected from the group consisting of Urea formaldehyde, Polyester resin, Epoxy resin, Melamine formaldehyde, Polycarbonate (PC), rubber, etc. Optionally, the 3D printable thermoplastic polymer material comprises a 3D printable thermoplastic polymer material selected from the group consisting of a polysulfone, a polyether sulfone, a polyphenyl sulfone, an imide (such as a poly ether imide) etc. Especially, the printable material per se is light transmissive, more especially optically transparent. PPMA, PC, amorphous PET, PS and co-polyesters of two or more thereof are suitable polymers (see also other examples herein). Blends of two or more of these may also be applied. Hence, especially polymeric materials may be applied that are at least partially transmissive for visible light. For instance, the polymeric material may be transparent to light (assuming the particles are not (yet) available).

Herein, the term "3D printable thermoplastic polymer material" may also be indicated as "printable thermoplastic polymer material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable thermoplastic polymer material" may also refer to a combination of two or more materials. In general these (polymeric) materials have a glass transition temperature $T_g$ and/or a melting temperature $T_m$. The 3D printable thermoplastic polymer material will be heated by the 3D printer before it leaves the nozzle to a temperature of at least the glass transition temperature, and in general at least the melting temperature. Hence, in a specific embodiment the 3D printable thermoplastic polymer material comprises a thermoplastic polymer having a glass transition temperature ($T_g$) and/or a melting point ($T_m$), and the printer head action comprises heating the 3D printable thermoplastic polymer material above the glass transition and if it is a semi-crystalline polymer above the melting temperature. In yet another embodiment, the 3D printable thermoplastic polymer material comprises a (thermoplastic) polymer having a melting point ($T_m$), and the printer head action comprises heating the 3D printable thermoplastic polymer material to be deposited on the receiver item to a temperature of at least the melting point.

The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

Specific examples of materials that can be used are transparent materials can e.g. be selected from the group consisting of, polycarbonate (PC), amorphous polyamides (PA), amorphous PET, polystyrene (PS), PET, PMMA, etc., and copolymers of two or more thereof (such as copolyesters). They may also contain dyes which may optionally be luminescent to obtain enhanced effects.

The printable material is especially printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed thermoplastic polymer material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed thermoplastic polymer material earlier printed on the substrate. Here below, further the term substrate is used, which may refer to a printing platform, a print bed, a substrate, a support, a build plate, or a building platform, etc., or a separate substrate thereon or comprised thereby. See further also below were specific (separate) substrates are discussed.

As indicated above, the 3D printable thermoplastic polymer material, and thus also the 3D printed thermoplastic polymer material comprises particulate material.

Different particles may have different dimensions. Hence, especially the dimensions indicated herein refer to an average of the dimension, especially an average over the total number of particles (see also below). Hence, in embodiments the 3D printable thermoplastic polymer material comprises particulate material embedded therein.

The particulate may be polydisperse (in their size distribution).

As indicated above, the particles have a longest dimension length (L1), a shortest dimension length (L2), and an aspect ratio AR defined as the ratio of the longest dimension length (L1) and the shortest dimension length (L2).

Therefore, in embodiments particles are used which have a longest dimension (A1) having a longest dimension length (L1), and a shortest dimension (A2) having a shortest dimension length (L2), wherein the longest dimension length (L1) and the shortest dimension length (L2) have an aspect ratio as defined herein. In case of spherical or cubic particles, L1 and L2 are identical.

Especially, the aspect ratios indicated herein, or the dimensions, such as the longest dimension, etc., indicated herein, refer to an average over the total number of particles. Hence, the term "in average" especially refers to a number average. As indicated above, the particulate may be polydisperse.

The particles may have a flake like structure, i.e. particles having a maximum width and a maximum length substantially larger than a maximum thickness, such as an aspect ratio of the maximum length and maximum thickness of especially at least 5, like at least 10, such as in the range of 10-10,000.

The aspect ratios, as indicted above, refer to the particles including an optional coating of the particles. The phrase "coating of the particles" especially refers to a coating on an individual particle, i.e. a coating enclosing a single particle. Hence, also the term "particle coating" may be used. The coating may enclose the particle entirely or only a part of the particle. The particles of a subset of the total number of particles may include a particle coating and anther subset of the total number of particles may not include a particle coating. Further, the aspect ratios indicated above may refer to a plurality of particles having different aspect ratios. Hence, the particles may be substantially identical, but the particles in the coating may also mutually differ, such as two or more subsets of particles, wherein within the subsets the particles are substantially identical.

To define the longest dimension and the shortest dimension or minor axes for the particles, herein the axes of a (virtual) rectangular parallelepiped with the smallest volume that encloses the particle may be used. The main and minor axes are defined perpendicular to the faces of the rectangular parallelepiped, the longest dimension having a longest dimension length (L1), a shortest dimension with a shortest dimension length (L2) and another or further (orthogonal axis) having a further dimension length (L3). Hence, the longest dimension may especially relate to a length of the particles, the shortest dimension may especially relate to a thickness or height of the particles, and the further dimension may especially refer to a width of the particles. Therefore, in embodiments the longest dimension, the shortest dimension, and a further dimension, define a rectangular parallelepiped with a smallest volume that encloses the particle. In case of spherical or cubic particles, L1, L2 and L3 are identical. In such virtual rectangular parallelepiped, the dimensions are defined orthogonal.

For particles wherein $1 \leq AR \leq 4$, i.e. $1 \leq L1/L2 \leq 4$, in embodiments also $1 \leq L1/L3 \leq 4$, though L3 may also be much smaller. For particles wherein $AR \geq 4$, i.e. $L1/L2 \geq 4$ in embodiments $L1/L3 \geq 1$, such as in embodiments $L1/L3 \geq 4$. The ratio L1/L3 may also be indicated as AR2. For instance, in embodiments $4 \geq AR2 \geq 10,000$ applies. Larger aspect ratios may be more difficult to process and/or more difficult to control the surface properties.

As indicated above, the particles may mutually differ. For instance, the particles may have a distribution of the sizes of one or more of the longest dimension, the shortest dimension (and the further dimension). Therefore, in average, the particles will have dimensions as described herein. For instance, at least 50 wt. % of the particles comply with the herein indicated dimensions (including ratios), such as at least 75 wt. %, like at least 85 wt. %. As known in the art, the particles may also have effective diameters indicated with d50. Such diameters may thus vary, as there may be a distribution of particle sizes.

Hence, in embodiments at least 50 wt. % of the particles, such as at least 75 wt. %, like at least 85 wt. % has a longest dimension with a length (L1) as defined herein, which may e.g. be 5 µm-1 mm, such as such as 5-500 µm.

The shortest dimension length may be selected from the same range as L1, but divided by AR.

Hence, in embodiments at least 50 wt. % of the particles, such as at least 75 wt. %, like at least 85 wt. % has a shortest dimension length (L2) as defined herein.

As indicated above, the further dimension length (L3) may be selected from the same range as L1, but divided by AR2 (though L3 may also be much smaller).

Hence, in embodiments at least 50 wt. % of the particles, such as at least 75 wt. %, like at least 85 wt. % has a further dimension length (L3) as defined herein.

In yet further embodiments, for at least 50 wt. % of the particles, such as at least 75 wt. %, like at least 85 wt. %, apply all these conditions for L1, L2 and L3 for each particle (of the at least 50 wt. %).

In specific embodiments, a mass median weight (or more) of the particles has a longest dimension with a length (L1) selected from the range as indicated herein. In yet further specific embodiments, a mass median weight (or more) of the particles has a shortest dimension length (L2) selected from the range as indicated herein. In further specific embodiments, a mass median weight (or more) of the particles has a further dimension with a further dimension length (L3) selected from the range as indicated herein. In yet further embodiments, a mass median weight (or more) of the particles comply with all these conditions for L1, L2 and L3.

Particles may be in the form of beads, fibers, platelets irregular shaped particles. In the case of symmetric particles, the largest dimension of the particles is especially in the range 5 µm-500 µm. In the case of asymmetric particles (fibers platelets) the largest dimension is preferably less than 1 mm.

In specific embodiments, the particles comprise one or more coated particles and uncoated particles, wherein the coating may comprise in (further) embodiments one or more of silver and aluminum, and wherein in specific embodiments the particles comprise one or more of mica particles, glass particles, and carbon particles.

In specific embodiments, also combinations of different type of particles may be used.

In specific embodiments, the 3D printable thermoplastic polymer material (and thus 3D printed thermoplastic polymer material) comprises one or more of polycarbonate (PC), (amorphous) polyethyleneterepthalate (PET), polymethylmethacrylate (PMMA), polystyrene (PS) etc., and copolymers, such as copolyesters, of two or more thereof. In specific embodiments, the 3D printable thermoplastic polymer material comprises up to 40 vol. % particles, relative to the total volume of the 3D printable thermoplastic polymer material (including the particles). Therefore, specific embodiments, the 3D printed thermoplastic polymer material comprises up to 40 vol. % of the particles, relative to the total volume of the 3D printed thermoplastic polymer material (including the particles).

In specific embodiments, it is also possible to include colorants such as dyes as well as luminescent dyes to obtain enhanced effects.

Further, the invention relates to a software product that can be used to execute the method described herein.

The printed product can be a decorative or a functional part of an application such as a luminaire. The (with the herein described method) obtained 3D printed item may be functional per se. The thus obtained 3D item may (alternatively) be used for decorative or artistic purposes. The 3D printed item may include or be provided with a functional component or may be comprised by a functional component. The functional component may especially be selected from the group consisting of an optical component, an electrical component, and a magnetic component. The term "optical component" especially refers to a component having an optical functionality, such a mirror, a light source (like a LED), etc. The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively or additionally, the functional component may comprise a thermal component (e.g. configured to cool or to heat an electrical component). Hence, the functional component may be configured to generate heat or to scavenge heat, etc.

Returning to the 3D printing process, a 3D printer may be used to provide the 3D printed item described herein. Therefore, in yet a further aspect the invention also provides a fused deposition modeling 3D printer, comprising (a) a printer head comprising a printer nozzle, and (b) a filament providing device configured to provide a filament comprising 3D printable thermoplastic polymer material to the printer head, wherein the fused deposition modeling 3D printer is configured to provide said 3D printable thermoplastic polymer material to a substrate.

Of course, the method may include printing a part of the 3D item with 3D printable thermoplastic polymer material comprising particles and printing a part of the 3D item with 3D printable thermoplastic polymer material without particles. Likewise, a 3D printed item may comprise regions with particles and regions without particles. Further, a 3D printed item may comprises regions with different structures.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
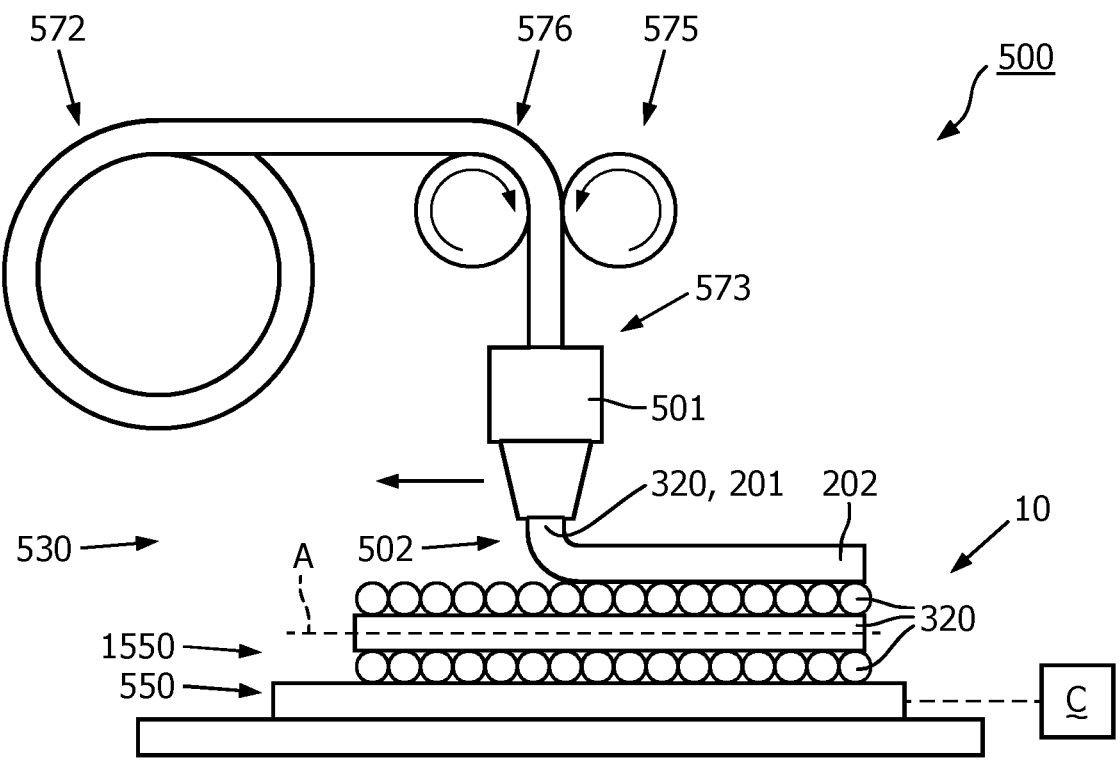
FIGS. 1a-1b schematically depict some general aspects of the 3D printer.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed thermoplastic polymer material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable thermoplastic polymer material (such as indicated above). For the sake of clarity, not all features of the 3D printer have been depicted, only those that are of especial relevance for the present invention (see further also below).

The 3D printer 500 is configured to generate a 3D item 10 by depositing on a receiver item 550, which may in embodiments at least temporarily be cooled, a plurality of filaments 320 wherein each filament 320 comprises 3D printable thermoplastic polymer material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202. Reference 1550 refers to a substrate. As indicated above, the term "receiver item" may refer to a printing platform, a print bed, a substrate, a support, a build plate, or a building platform, etc. Instead of the term "receiver item" also the term "substrate" may be used.

Reference 572 indicates a spool or roller with material, especially in the form of a wire. The 3D printer 500 transforms this in a filament or fiber 320 on the receiver item or on already deposited printed material. In general, the diameter of the filament downstream of the nozzle is reduced relative to the diameter of the filament upstream of the printer head. Hence, the printer nozzle is sometimes (also) indicated as extruder nozzle. Arranging filament by filament and filament on filament, a 3D item 10 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system, configured to control the temperature of the receiver item 550. The control system C may include a heater or may be functionally coupled to a heater, which may be able to heat the receiver item 550 to at least a temperature of 50° C., but especially up to a range of about 350° C., such as at least 200° C. The control system may especially be configured to control the 3D printing method, such as including controlling a layer height, etc.

Figure 1B:
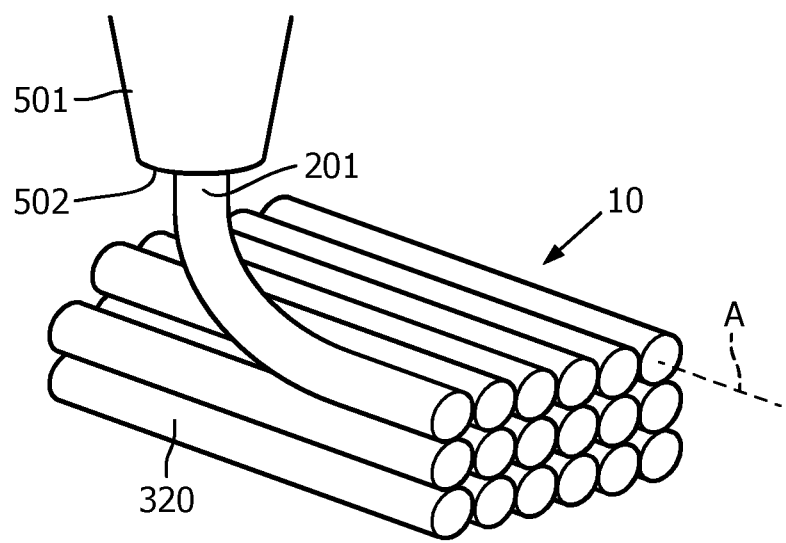

FIG. 1b schematically depicts in 3D in more detail the printing of the 3D item 10 under construction. Here, in this schematic drawing the ends of the filaments 320 in a single plane are not interconnected, though in reality this may in embodiments be the case.

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 320 comprising 3D printable thermoplastic polymer material 201 to the first printer head 501, and optionally (c) a receiver item 550. In FIGS. 1a-1b, the first or second printable material or the first or second printed material are indicated with the general indications printable material 201 and printed material 202.

Figure 2A:
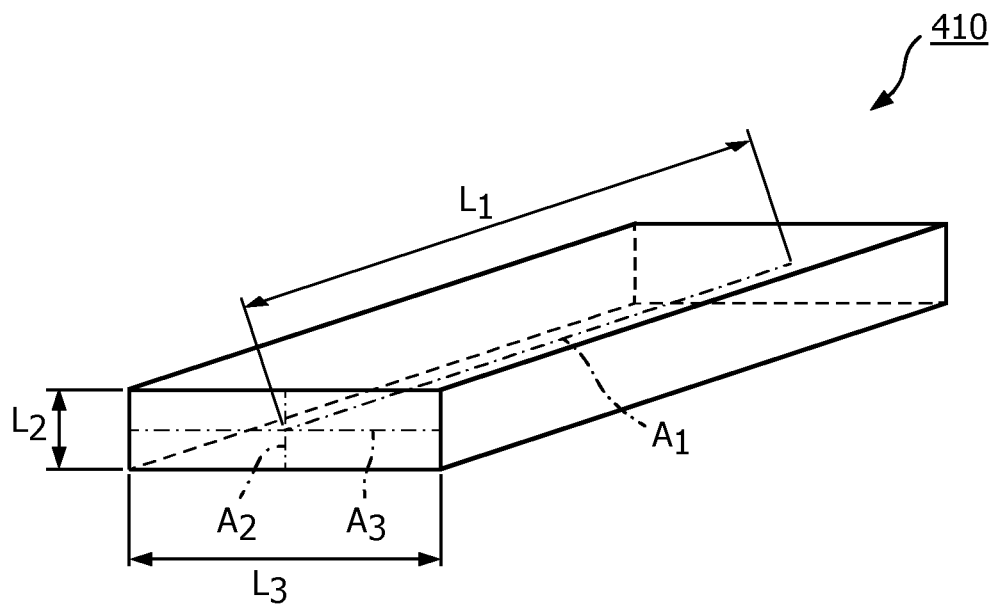
FIGS. 2a-2e schematically depict some aspects of the particles, such as flakes, that can be used herein.
Figure 2B:
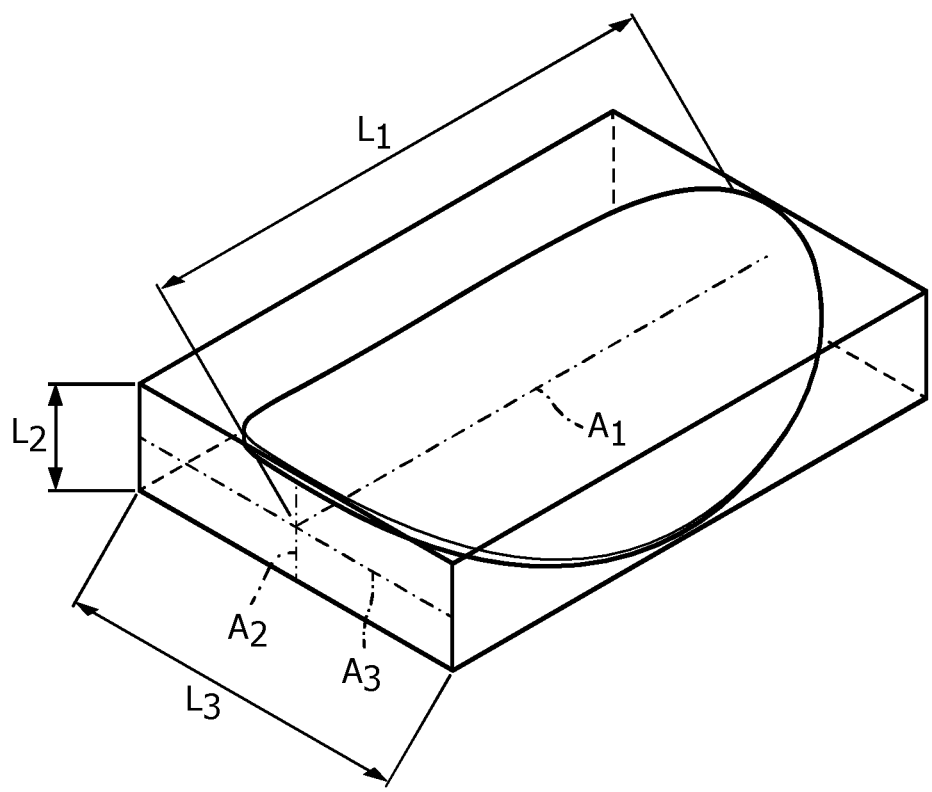

FIGS. 2a-2e schematically depict some aspects of the particles 410. Some particles 410 have a longest dimension A1 having a longest dimension length L1 and a shortest dimension A2 having a shortest dimension length L2. As can be seen from the drawings, the longest dimension length L1 and the shortest dimension length L2 have a first aspect ratio larger than 1. FIG. 2a schematically depicts a particle 410 in 3D, with the particle 410 having a length, height and width, with the particle (or flake) essentially having an elongated shape. Hence, the particle may have a further (minor or main) axis, herein indicated as further dimension A3. Essentially, the particles 410 are elongated thin particles, i.e. L2<L1, especially L2<<L1, and L2<L3, especially L2<<L3. L1 may e.g. be selected from the range of 1-500 μm; likewise L3 may be. L2 may e.g. be selected from the range of 0.1 μm-10 μm. Also L3 may e.g. be selected from the range of 0.1 μm-10 μm. However, L2 and/or L3 may also be longer, such as up to 5 mm, such as up to 1 mm, like up to 100 μm. FIG. 2b schematically depicts a particle that has a less regular shape such as pieces of broken glass, with a virtual smallest rectangular parallelepiped enclosing the particle.

Note that the notations L1, L2, and L3, and A1, A2 and A3 are only used to indicate the axes and their lengths, and that the numbers are only used to distinguish the axis. Further, note that the particles are not essentially oval or rectangular parallelepiped. The particles may have any shape with at least a longest dimension substantially longer than a shortest dimension or minor axes, and which may essentially be flat. Especially, particles are used that are relatively regularly formed, i.e. the remaining volume of the fictive smallest rectangular parallelepiped enclosing the particle is small, such as less than 50%, like less than 25%, of the total volume.

Figure 2C:
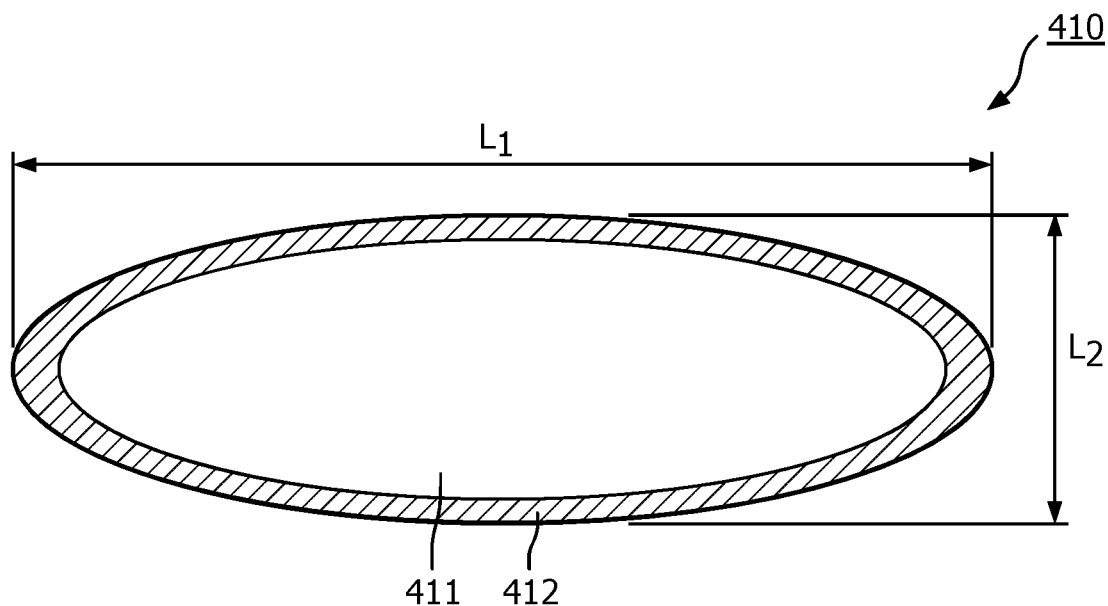

FIG. 2c schematically depicts in cross-sectional view a particle 410 including a coating 412. The coating may comprise light reflective material. For instance, the coating may comprise a (white) metal oxide. In other embodiments, the coating may essentially consist of a metal, such as an Ag coating. In other embodiments the coatings may only be on one or both of the large surfaces and not on the thin side surfaces of the particles.

Figure 2D:
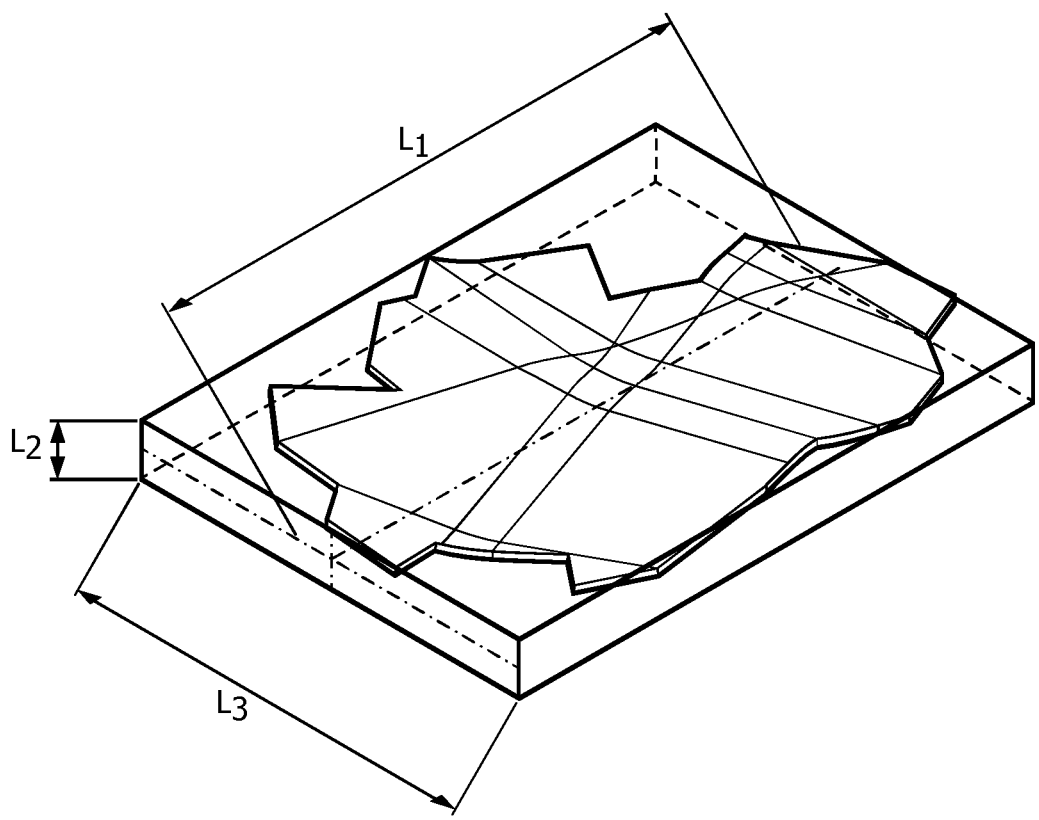

FIG. 2d schematically depicts a relatively irregularly shaped particle. The particulate material that is used may comprise e.g. small broken glass pieces. Hence, the particulate material that is embedded in the 3D printable thermoplastic polymer material or is embedded in the 3D printed thermoplastic polymer material may include a broad distribution of particles sizes. A rectangular parallelepiped can be used to define the (orthogonal) dimensions with lengths L1, L2 and L3.

Figure 2E:
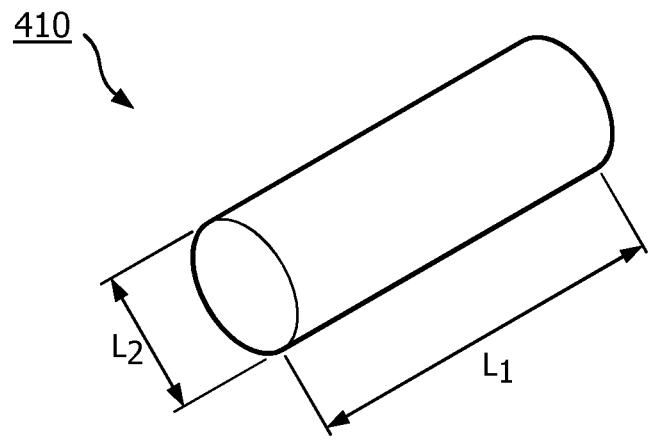
Figure 2E:
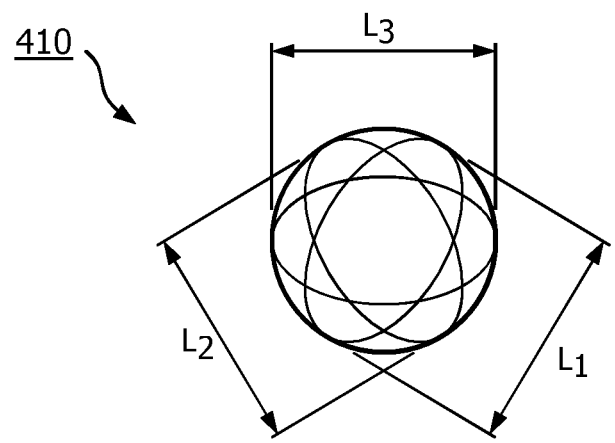
Figure 2E:
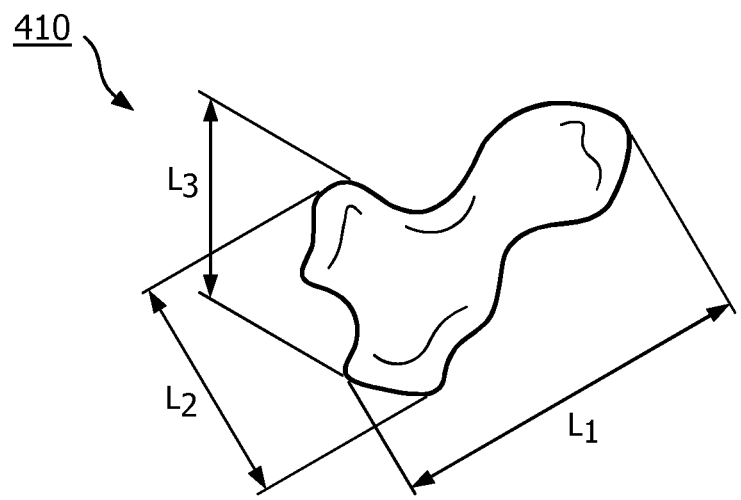

Especially, particles with an irregular 3-D shape, a cylindrical shape (such as a short fiber), a spherical shape, are particularly relevant. FIG. 2e schematically depict cylindrical, spherical, and irregularly shaped particles.

Figure 3A:
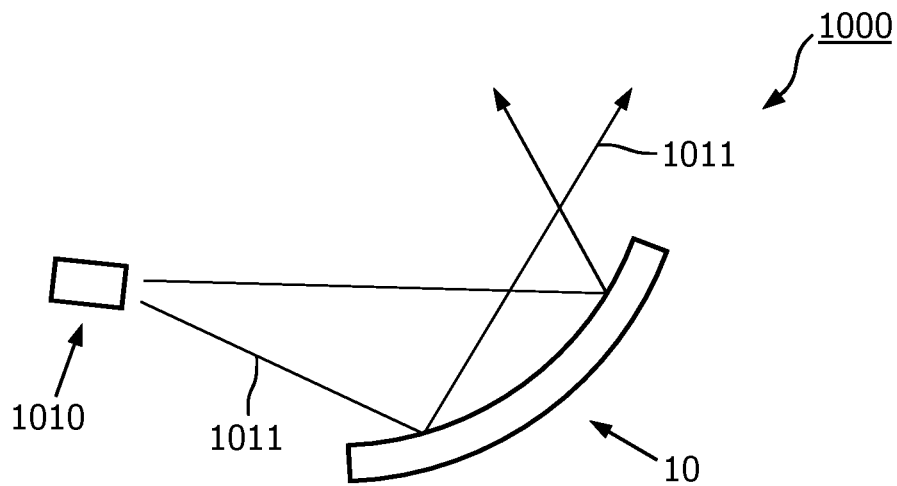
FIGS. 3a-3b schematically depict some applications, including 3D printed items.

FIG. 3a schematically depicts a lighting system 1000 comprising a) a light source 1010 configured to generate light source light 1011 and b) an object 10, such as defined above, configured to reflect or transmit at least part of said light source light 1011. Other functions of the object 10 may also be possible, such as a lamp shade, a wall of a device, etc.

Figure 3B:
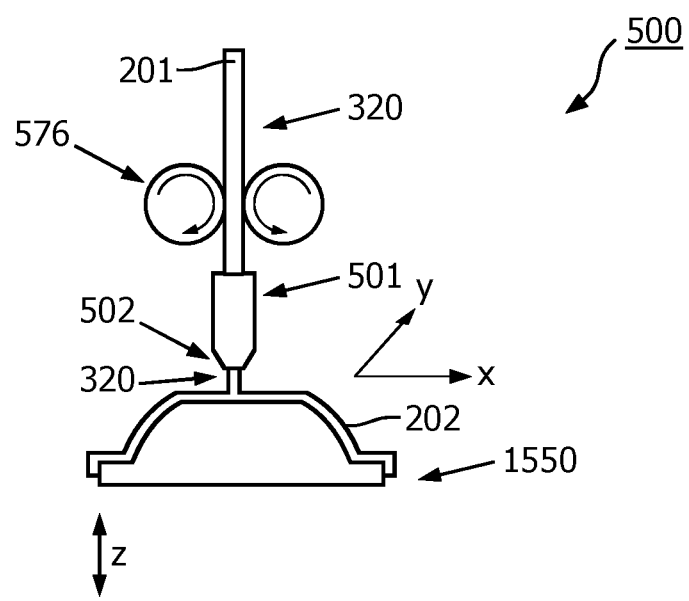

For printing lamps and luminaires or other items, it may be desirable to create curved or angular shapes. The cactus like effect is especially well visible in curved or angular shapes. Hence, amongst others we suggest herein the use of a curved or angular shapes receiver item 1550. The 3D printer can print on top of the surface of such shaped receiver item 1550, see FIG. 3b.

In injection molded parts surface finish and texture is realized by texturing the mold. As indicated above, in the case of FDM this need to be in a different way. For this purpose we suggest using various filler materials such as glass beads, fibers etc. In the case of essentially symmetric particles (beads, irregular shaped powders) to obtain the desired effect, the particle size may especially be in the range of 5 μm-500 μm. In the case of asymmetric particles (fibers, platelets) the largest dimension of 1 mm and aspect ratio of in the range 1-5 appeared to be the most desired range (in experiments that were executed). The most desirable particle concentration is found to be less than 15% volume (relative to the total volume of the 3D printed thermoplastic polymer material.

Figure 4A:
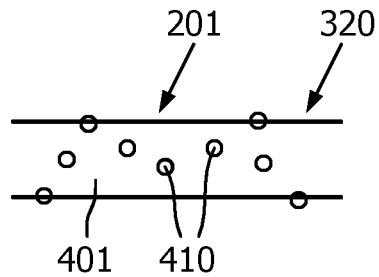
FIGS. 4a-4c schematically depict some further aspects of the invention.

FIG. 4a schematically depicts a filament 320, such as when escaping from a printer nozzle (not depicted), which comprises 3D printable thermoplastic polymer material 201. The 3D printable thermoplastic polymer material comprises thermoplastic material 401 with particles 410 embedded therein.

Figure 4B:
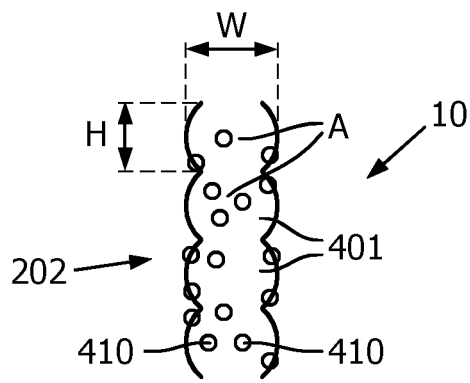

FIG. 4b schematically depicts a 3D item 10, showing the ribbed structures (originating from the deposited filaments), having layer heights H and a layer width W.

Figure 4C:
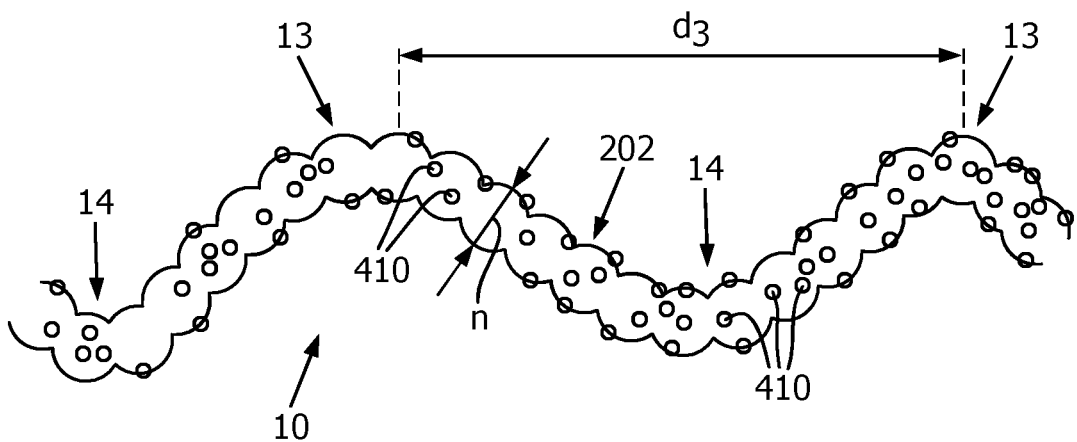
Figure 5A:
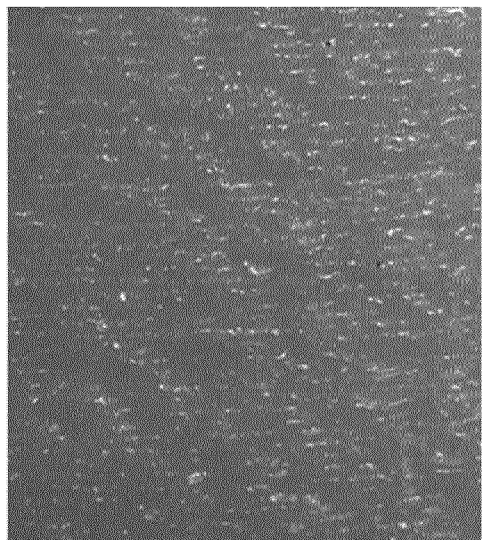
FIGS. 5a-5c show some pictures of 3D items that were printed.
Figure 5B:
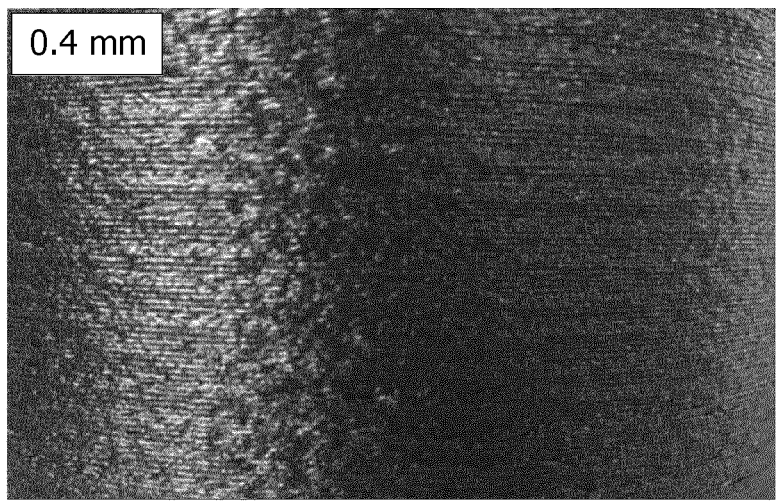
Figure 5C:
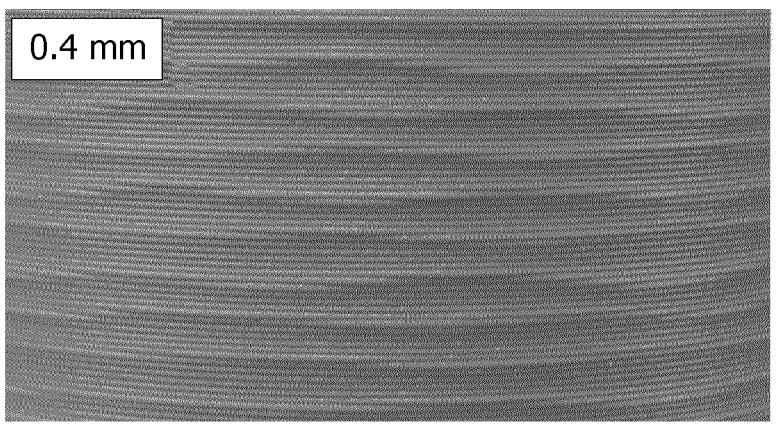

FIG. 4c schematically depicts a 3D printed item 10 with a substructure with a plurality of tops 13 and a plurality of bottoms 14. The top-top distance is indicated with reference d3.

A number of 3D printed items were generated

| | Series 1<br>1 ≤ AR ≤ 4 and<br>1 ≤ H/L2 ≤ 5 | Series 2<br>AR ≥ 4 and H/L1 ≤ 1 | Series 3<br>1 ≤ AR ≤ 4 and<br>5 ≤ H/L2 ≤ 100 |
|---|---|---|---|
| Thermoplastic material | PC | PC | PC |
| Particle material | glass | glass | glass |
| Particle size (L1) | 200 μm | 140 | 30 μm |
| Shortest dimension length (L2) | 200 μm | 20 | 10 μm |
| Aspect ratio | 1 | 7 | 3 |
| Layer height (H) | 0.1 mm; 0.4 mm; 0.6 mm; 0.8 mm | 0.10 mm | 0.1 mm; 0.4 mm |
| Substructure | — | — | d3/H = 8, 3.2 |
| FIG. | 5a | 5b | 5c |

In series 1, it was observed that up to 0.8 mm rib thickness the ribbed structure becomes less visible. The beads help to hide the ribbed structure.

In series 2, cactus-type surfaces were obtained. Very rough surfaces layer where fibers get oriented and form needles.

In series 3, matt surfaces were obtained with a substructure.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for 3D printing a 3D item with a predetermined surface texture using Fused Deposition Modeling (FDM), the method comprising:
   (i) providing 3D printable thermoplastic polymer material comprising particles embedded in the 3D printable thermoplastic polymer material, wherein the particles have a longest dimension length L1, a shortest dimension length L2, and an aspect ratio AR defined as the ratio of the longest dimension length L1 and the shortest dimension length L2,
   (ii) depositing during a printing stage 3D printable thermoplastic polymer material to provide the 3D item; and controlling the predetermined surface texture via adjustments to the AR and H/L1 and to provide the 3D item with layers of the 3D printed thermoplastic polymer material with a layer height H, wherein 4≤AR≤10,000 and 0.001≤H/L1≤1.

2. The method according to claim 1, wherein the longest dimension length L1 is selected from the range of 5 μm-1 mm, wherein the layer height H is selected from the range of 50 μm-10 mm, and wherein the 3D printable thermoplastic polymer material comprises in the range of 1-15 vol. % of the particles, relative to the total volume of the 3D printable thermoplastic polymer material.

3. The method according to claim 1, wherein the 3D printable thermoplastic polymer material comprises in the range of 1-5 vol. % of the particles, relative to the total volume of the 3D printable thermoplastic polymer material.

4. The method according to claim 1, wherein the 3D printable thermoplastic polymer material may comprise one or more of acrylonitrile butadiene styrene, polystyrene, polycarbonate, polyethyleneteleptlate, polymethylmethacrylate, and copolymers of two or more of these.

5. The method according to claim 1, wherein the particles comprise one or more coated particles and uncoated particles, wherein the coating comprises one or more of silver and aluminum, and wherein the particles comprise one or more of mica particles, glass particles, and carbon particles.

6. The method according to claim 1, wherein the particles comprise elongated shaped particles.

7. The method according to claim 1, wherein one or more of the 3D printable thermoplastic polymer material and the particles are transmissive for one or more wavelengths in the visible light spectrum.

8. The 3D printed item according to claim 1, wherein the longest dimension length L1 is selected from the range of 5 μm-1 mm, wherein the layer height H is selected from the range of 50 μm-10 mm, and wherein the 3D printed thermoplastic polymer material comprises in the range of 1-15 vol. % of the particles relative to the total volume of the 3D printed thermoplastic polymer material.

9. The 3D printed item according to claim 1, wherein the particles comprise elongated shaped particles.

10. The 3D printed item according to claim 1, wherein the 3D printable thermoplastic polymer material comprises in the range of 1-5 vol. % of the particles, relative to the total volume of the 3D printable thermoplastic polymer material, and wherein the 3D printable thermoplastic polymer material may comprise one or more of acrylonitrile butadiene styrene, polystyrene, polycarbonate, polyethyleneteleptlate, polymethylmethacrylate, and copolymers of two or more of these, and wherein the particles comprise one or more coated particles and uncoated particles, wherein the coating comprises one or more of silver and aluminum, and wherein the particles comprise one or more of mica particles, glass particles, and carbon particles.

11. The 3D printed item according to claim 1, wherein the 3D printed item has a surface, wherein the surface comprises substructures with tops and bottoms, wherein the substructures comprise a plurality of layers with a top-to-top distance (d3) between adjacent tops, wherein d3/H≥10.

12. A lighting system comprising (a) a light source configured to generate light source light and (b) a 3D printed item according to claim 1, configured to transmit or reflect at least part of the light source light.

13. The method according to claim 1, wherein the particles comprise fiber shaped particles.

14. The 3D printed item according to claim 1, wherein the particles comprise fiber shaped particles.

15. A method for 3D printing a 3D item with a predetermined surface texture using Fused Deposition Modeling (FDM), the method comprising (i) providing 3D printable thermoplastic polymer material comprising particles embedded in the 3D printable thermoplastic polymer material, wherein the particles have a longest dimension length L1, a shortest dimension length L2, and an aspect ratio AR defined as the ratio of the longest dimension length L1 and the shortest dimension length L2, and (ii) depositing during a printing stage 3D printable thermoplastic polymer material to provide the 3D item with layers of the 3D printed thermoplastic polymer material with a layer height H, wherein 4≤AR≤10,000 and 0.001≤H/L1≤1 to provide a surface texture with cactus like effect wherein the cactus like effect is produced by adjustments to the AR and H/L1.

16. The method for 3D printing a 3D item according to claim 15, wherein the cactus like effect has layer height H, and longest dimension length L1, of 0.5<H/L1<1, wherein L1 is larger than H but L1 is smaller than 2H.

* * * * *